United States Patent [19]

Sharp

[11] Patent Number: 5,134,878

[45] Date of Patent: * Aug. 4, 1992

[54] FILL LINE SPILL CONTAINMENT SYSTEM

[76] Inventor: Bruce R. Sharp, 7685 Fields-Ertel Rd., Cincinnati, Ohio 45241

[*] Notice: The portion of the term of this patent subsequent to Oct. 1, 2008 has been disclaimed.

[21] Appl. No.: 678,114

[22] Filed: Apr. 1, 1991

Related U.S. Application Data

[63] Continuation-in-part of Ser. No. 504,124, Apr. 3, 1990, Pat. No. 5,052,216, which is a continuation-in-part of Ser. No. 450,820, Dec. 14, 1989, Pat. No. 5,052,217, which is a continuation-in-part of Ser. No. 281,816, Dec. 8, 1988, Pat. No. 4,912,966, which is a continuation-in-part of Ser. No. 66,691, Jun. 26, 1987, abandoned.

[51] Int. Cl.⁵ .............................. G01M 3/32
[52] U.S. Cl. ...................... 73/49.2; 220/86.1
[58] Field of Search .......... 73/49.2; 220/DIG. 5, 220/85 S, 85 UR, 85 V S, 1 B, 18, 5 A; 137/312

[56] References Cited

U.S. PATENT DOCUMENTS

| | | | |
|---|---|---|---|
| 1,156,469 | 10/1915 | Dodge | 220/85 S |
| 4,527,708 | 7/1985 | Dundas et al. | 220/85 S X |
| 4,637,522 | 1/1987 | Klop | 220/85 VR X |
| 4,639,164 | 1/1987 | Pugnale et al. | 220/1 B X |
| 4,653,312 | 3/1987 | Sharp | 73/49.2 |
| 4,655,361 | 4/1987 | Clover et al. | 220/18 X |
| 4,685,327 | 8/1987 | Sharp | 73/49.2 |
| 4,685,585 | 8/1987 | Robbins | 220/5 A X |
| 4,717,036 | 1/1988 | Dundas et al. | 220/85 S X |
| 4,884,709 | 12/1989 | McCarthy | 220/1 B X |
| 4,895,272 | 1/1990 | DeBenedittis et al. | 220/85 S |

FOREIGN PATENT DOCUMENTS

| | | | |
|---|---|---|---|
| 755751 | 2/1971 | Belgium | 220/85 S |
| 763788 | 8/1971 | Belgium | 220/85 S |
| 2900960 | 7/1969 | Fed. Rep. of Germany | 73/49.2 |
| 1548526 | 10/1968 | France | 73/49.2 |
| 565999 | 8/1975 | Switzerland | 73/49.2 |

Primary Examiner—Hezron E. Williams
Assistant Examiner—Joseph W. Roskos
Attorney, Agent, or Firm—Charles R. Wilson

[57] ABSTRACT

A storage tank system especially useful for storing gasoline comprises a storage tank, a sleeve with sleeve cover positioned on the storage tank, a drip sump compartment positioned on the cover of the sleeve and a fill line extending through the drip sump compartment and sleeve. The storage tank as well as structural accessories such as a dispensing line can have an outer containment wall. The system results in a storage facility which is capable of containing minor spills from a filling operation.

13 Claims, 3 Drawing Sheets

FILL LINE SPILL CONTAINMENT SYSTEM

This application is a continuation-in-part of "Containment Means For Storage Tank Systems", Ser. No. 07/504,124, filed Apr. 3, 1990, now U.S. Pat. No. 5,052,216 which is a continuation-in-part of "Containment System For Fill Line Of Underground Storage Tank", Ser. No. 07/450,820 filed Dec. 14, 1989 which is a continuation-in-part of "Total Containment Means For Storage Tank Systems", Ser. No. 07/281,816, filed Dec. 8, 1988, now U.S. Pat. No. 4,912,966 which is a continuation-in-part of "Total Containment And Overfill Storage Tank System", Ser. No. 07/066,691, filed Jun. 26, 1987, now abandoned.

FIELD OF INVENTION

This invention relates to liquid storage tank systems. More particularly, the invention relates to storage tank systems having fill line spill containment means.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. Typical underground storage tanks are constructed with structural accessories such as a manway, its lid, and access lines for filling, dispensing, and venting. The accessories described are examples of structures through which liquids and vapors flow and all of which are normally located at the top of the tank.

The access line which has proved most troublesome to adequately ensure against spillage and leakage has been the line for periodically filling the storage tank. This line extends from ground surface to the underground storage tank. Spillage at ground surface level can occur when the line is accessed by a transport tank truck operator for filling of the storage tank. Extreme care must be taken so that minor drippings do not occur since even minor drippings from repeated fillings over a course of years can ultimately become excessive. Drip sumps around the ground surface level of the fill line have helped.

Another problem experienced by the fill lines is that if made of steel, as is conventional, they tend to corrode from contact with surrounding soil. A drip sump which extended from ground surface to the storage tank would appear to solve the problems in that it would catch accidental drippings from the filling operation as well as protect the fill line from contact with the soil. However, a deep drip sump itself creates problem in that debris which enters is difficult to remove because of the depth.

A large secondary containment area to encompasses all the access lines has been suggested. This would allow for better access means to enter the area and reach the various fittings, remove debris, etc. However, any drippings which reach any such relatively large containment area, whether directly or indirectly, create a potentially dangerous situation. The drippings can vaporize and with the right vapor-oxygen ratio can explode if an ignition source is present such as from electrical equipment often contained at or near the storage tank's access lines or hot exhaust gas from a vehicle. As can be appreciated, there are several requirements that must be considered in the designing of a containment system for access lines to an underground tank.

The service life of a storage tank system will vary, but eventually the tank and its access lines will leak. Leaks from the tank system often happen within a few years after the new tank and lines are installed, due to improper installation or flaws in the manufacturing of the tanks and lines. Leakage problems are particularly troublesome in that gasoline storage tanks are usually buried underground. Any leaks which develop are normally very slow initially and are very difficult to detect. Leaks from subterranean tanks or their accessories can result in a significant danger to the environment and health of nearby residents. Federal as well as local regulations govern the design and maintenance of such storage tanks.

Heightened public awareness of the danger posed by underground storage tanks has led to additional governmental regulations. Recent proposed regulations will require most storage tanks to have secondary containment means and possibly a fail safe leak detection design feature to guard against accidental soil and water contamination. Secondary containment is accomplished by a jacket completely encasing the tank and structural accessories. The tank and related accessories are referred to as the primary containment system. Any jacket or wall encasing the primary system is often referred to as a secondary containment system. While seemingly simple in design, total containment with full consideration for all aspects of the system has been difficult.

There now has been discovered a system for enclosing the fill line and, optionally, other structural accessories of a liquid underground storage tank which solves problems associated with many known systems. Additionally, the storage tank itself can have a secondary containment feature. The present invention solves the problems inherent with existing tank systems. It is useful with new tank systems and as well as a retrofit to buried tank systems.

SUMMARY OF THE INVENTION

The present invention is concerned with underground storage tank systems. The system comprises (a) a storage tank, (b) a sleeve positioned on the tank to form an area through which a fill line and optionally other access lines pass, said sleeve further having a cover to form a sleeve area, (c) a drip sump compartment positioned on the cover to the sleeve, said compartment having means for communication with the interior of the storage tank and (d) a fill line which extends through the drip sump compartment and the sleeve area. The fill line has one end terminating near a top of the drip sump compartment near ground surface for filling purposes and a second end opening directly into the storage tank's interior. The fill line is encompassed by the drip sump compartment and sleeve.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
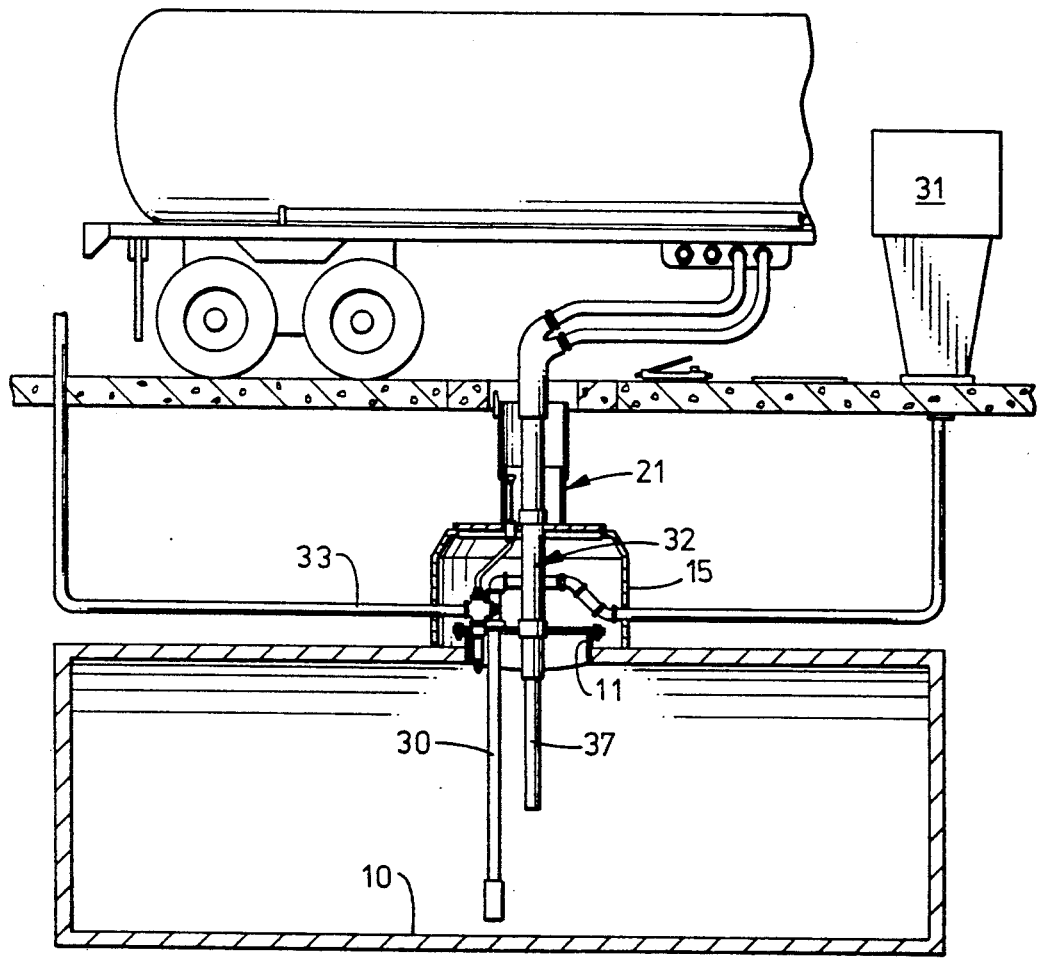
FIG. 1 is a side view, partially in section, of the storage tank system of this invention having a fill line spill containment means positioned on an underground storage tank.
Figure 2:
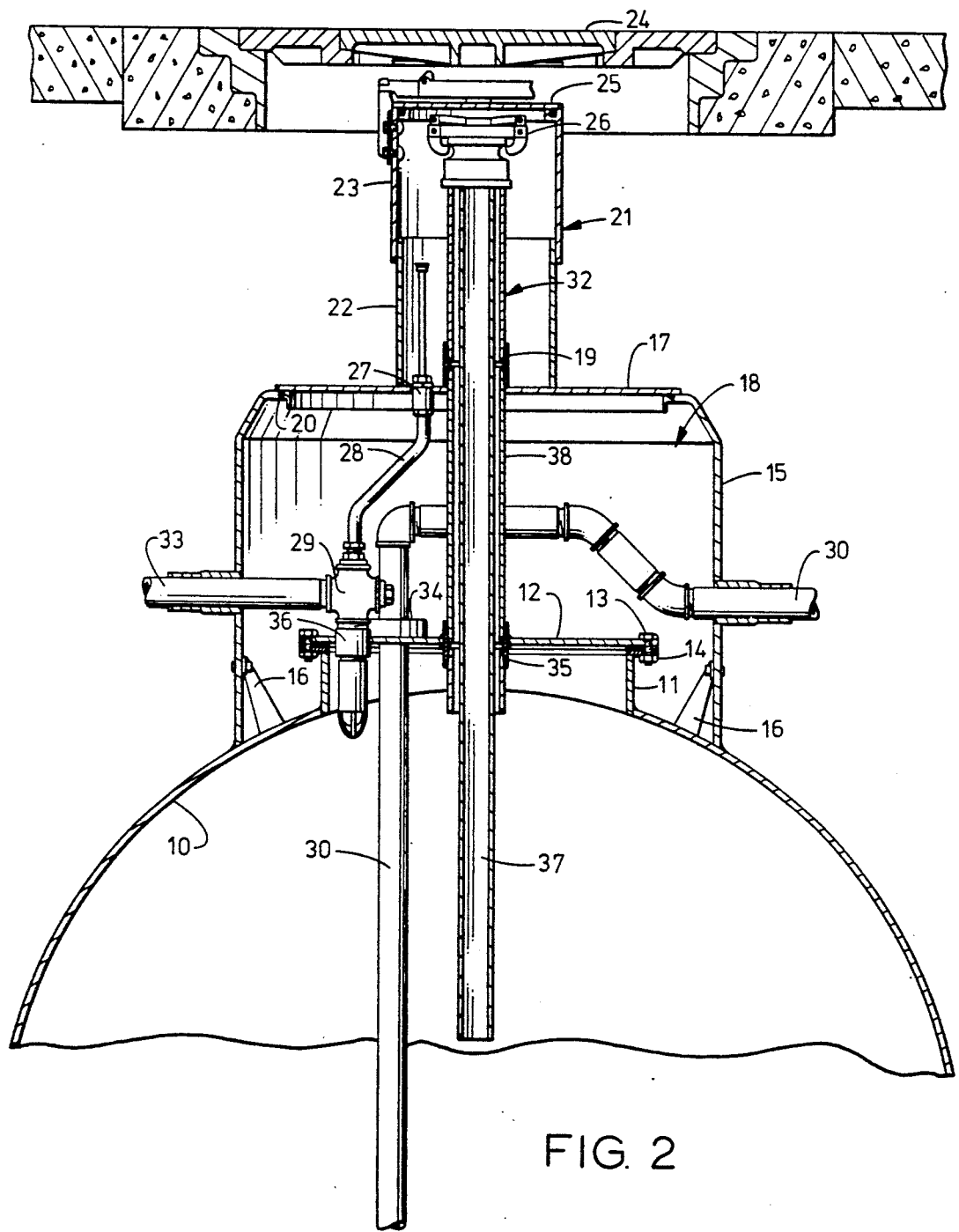
FIG. 2 is a cross-section view, partially in section of the storage tank system of FIG. 1.

With reference to FIGS. 1 and 2, the present invention utilizes an inner storage tank 10. The inner tank is made of metal such as steel. A fibrous reinforced resinous material e.g. a fiberglass reinforced polyester or vinylester material can also be used to form the tank. As shown, though not required, a manway 11 is securely attached to the storage tank. The manway's primary function is to serve as a means by which access can be gained to the interior of the tank. Removal of a cover 12 after disconnecting all access lines passing through the cover will allow an individual to enter the tank for repair or inspection purposes. As a secondary function, the manway provides a means by which the various access lines enter the tank. The manway is generally cylindrical in shape and about one to three feet in diameter, though other shapes and dimensions can be utilized. The cover 12 is securely fastened to the manway 11, preferably in liquid tight fashion by known attachment means, e.g. bolts 13, nuts 14 and gasket (not shown). Storage tanks used in this invention, with or without the manway are well known and are commonly used for storage of various liquids.

In accord with this invention, a sleeve 15 extends around the manway 11. The sleeve is preferably cylindrical in shape but can be other shapes as well and extends about twelve inches to about forty-eight inches, preferably about eighteen inches to about thirty inches, above the storage tank 10. The sleeve is positioned on a top surface of the storage tank. It is positioned so as to rest on the top surface and is preferably steadied by sleeve supports 16 attached to the tank and the sleeve. The sleeve supports 16 are brackets dimensioned to attach to the cylindrical-shaped tank 10 and the cylindrical-shaped sleeve 15. Preferably, each support is made of a similar material as the tank. Other sleeve supports of various natures can be used. For example, a ring properly dimensioned, can be attached to the storage tank and the sleeve slides into or over the ring and are secured together. The sleeve can as well rest on or near the top of the storage tank with back fill alone retaining it in place. A loose seal is sufficient where the sleeve and wall of the storage tank are in contact to exclude back fill or other materials from entering the interior of the sleeve.

The sleeve is positioned on the storage tank in a non-liquid tight manner. As a result it is feasible to use the sleeve of this invention for retrofitting previously used buried storage tanks where a liquid tight fit is difficult to achieve. Yet the advantage of the sleeve in isolating the fill line from surrounding soil to avoid an added expense of cathodically protecting the fill line is attained. Additionally, the sleeve still facilitates access to the interior of the storage tank for inspection and repair purposes.

A sleeve cover 17 rests on the sleeve to form the sleeve area 18 within the sleeve. The cover is preferably held in a light tight relationship to the sleeve. A compression coupling 19 in FIG. 2 is used for this purpose. The sleeve cover 17 rests on a flange of the sleeve 15. A compression gasket 20 is positioned between the sleeve flange and sleeve cover. Tightening of the coupling 19 on a threaded line passing through the cover, e.g. a fill line creates an equal pressure around the periphery of the cover. A threaded rod could as well be used for this purpose with the fill line passing through the cover at an off-center location. The cover can also rest on a flange of the sleeve and be bolted thereto.

A drip sump compartment 21 for catching spills during a filling operation is positioned on the sleeve cover 17. Liquid capacity of the sump area within the compartment 21 is approximately one to twenty-two gallons, preferably about three to about six gallons. The area within the compartment is not intended for overfill purposes, but rather is used as a spill or drippings catcher. The problem with using the sump area as a overfill area is that it is not doubled walled and is lacking in capacity. The sump area is used to collect any spills or drippings that may result from a loose connection and/or during disconnecting of a flexible delivery hose leading from a transport tank truck to the fill line as discussed below.

The drip sump compartment 21 has a lower cylinder 22, preferably immovably attached and preferably attached in a liquid tight manner, to the sleeve cover 17. The lower cylinder 22 has secured to it an adjustable slide height upper cylinder 23 which can be moved so that its top rim is near the under surface of a conventionally used surface manhole cover 24. The preferred height of the lower and upper cylinders as measured from the sleeve cover 17 is about one to fifteen inches, but not exceeding about thirty-six inches. The diameter of the compartment 21 is about nine inches to about fifteen inches. When the preferred height is adjusted to be in proper proximity to the surface manhole cover, cylinders 22 and 23 are sealed together. Sealing methods such as gluing, welding, or band clamping are various known methods which can be used.

An optional cover cap is provided over the adjustable slide height cylinder 23 to keep the interior sump area free of dirt and water. Other means as well can be used to ensure that the drip sump compartment area remains free of debris. For example, the upper cylinder 23 of the drip sump compartment could extend to the manhole cover 24 and possibly be connected thereto in a fashion which does not hinder access to the fill line during a filling operation. An fill line cap 26 is provided on the fill line to seal off the tank's interior.

A sump drain valve 27 is used to drain any spills or drippings caught within the drip sump compartment 21 back to the storage tank 10. The valve is securely fastened and preferably sealed to the cover 17. Upon opening the valve the liquids are drained through a drain hose 28 into the top of a T-vent 29, which is in communication with the interior of the storage tank 10 through the vent line. The drain hose can as well be connected directly to the fill line, storage tank or the manway cover.

Passing through the sleeve and then the manway or storage tank are various access lines typically associated with underground storage tanks. As seen in FIGS. 1 and 2, a dispensing line 30 leads to a ground level gasoline dispenser 31, a fill line 32 leads to a capped opening within the drip sump compartment 21 at or near the ground surface and a vent pipe 33 leads to the atmosphere. As evident in FIG. 2, they are secured to the manway's cover by double threaded bushings 34, 35, and 36, respectively. In that embodiment of the invention wherein the storage tank has no manway, the aforementioned access lines are secured directly to the top surface of the tank within the sleeve area.

A second drip sump compartment can optionally be positioned on the sleeve cover. The second compartment would be used to encase another line, e.g. the dispensing line or the vapor recovery tube of a two point fill system to ensure primary containment of such lines. It should be apparent as well that all lines could alternatively pass through a single drip sump compartment.

The fill line 32 as shown is a coaxial fill line comprised of an inner fill pipe 37 and a concentric outer vapor recovery tube 38. The fill pipe extends into the storage tank with an opening near the tank's bottom surface to minimize splashing and consequent vapor formation during the filling operation. The vapor recovery tube 38 has one opening at the tank's top surface. A second opening is at the upper or fill end of the fill line. Its purpose is to receive vapors from the filling operation and direct them back to a return line leading to the transport tank truck. It should be apparent that the storage tank's accessories are encompassed by the sleeve 15. The tank's manway 11 is encompassed by the sleeve 15 while the fill line 32 is encompassed by the drip sump compartment 21 and the sleeve 15. Any accidental spills during a filling operation will be caught by the drip sump compartment and directed to the storage tank. Further, it should be evident that the fill line is completely protected from contact with the surrounding earth.

Figure 3:
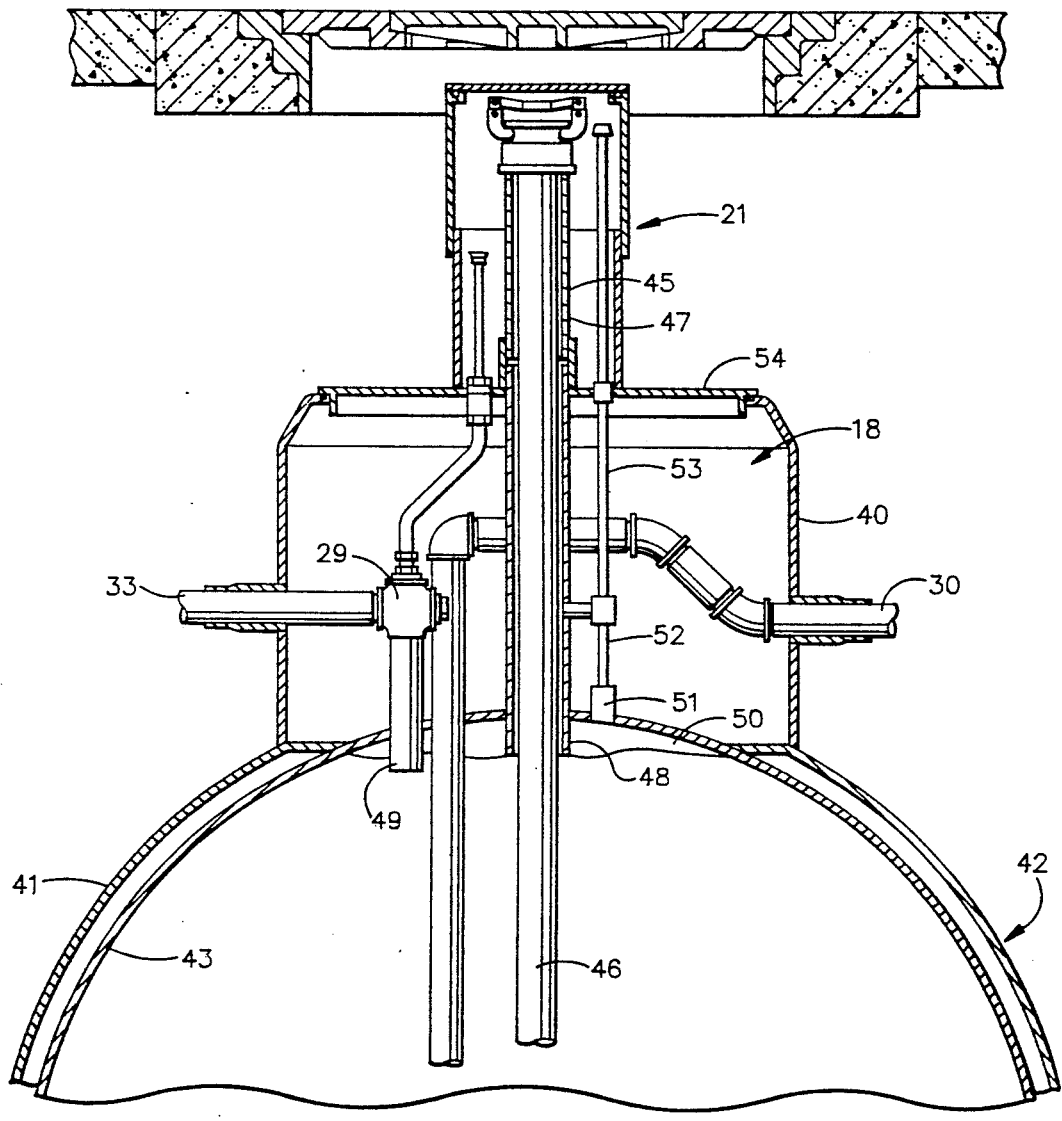
FIG. 3 is an end view, partially in section, showing an embodiment of the invention wherein the sleeve of the fill line spill containment means is positioned on the outer wall of a double wall storage tank system and further showing an internal retained capacity overfill system.

As shown in FIG. 3 a double wall storage tanks can be used in this invention. The outer wall acts as a secondary containment means in case of leakage through the inner wall. A fill line spill containment means is shown wherein a sleeve 40 is attached to an outer wall 41 of a double wall tank system 42. The sleeve and outer wall effectively encompasses the inner storage tank 43. The outer wall 41 is constructed of a material of sufficient strength to contain the stored gasoline in case of a leak. The outer wall can be made of a thin gauge steel or, as shown, a synthetic polymeric material, including an elastomeric material such as rubber, e.g. Buta-N, neoprene, fluoroelastomer, e.g. Viton, polyester, vinyl esters, polyethylene (preferably a high density polyethylene), polypropylene, polyvinylchloride, polyurethane, polyepoxie and various fiber reinforced, fabric and vinyl backed sheets of any of the foregoing materials as well as materials constructed of two or more of the foregoing materials, e.g. fluoroelastomer coated polyethylene. Fiberglass reinforced polyesters and vinyl esters are two preferred wall materials. The listed materials used in construction of the outer wall are not all inclusive, but only illustrative of some of the materials that can be used. Preferably, the outer wall is made of at least one material which is gasoline impervious.

The shape of the outer wall 41 is such that it encases the inner storage tank 43 to form a closed space. The outer wall 41 extends into the sleeve area and is attached in a liquid tight manner to a top surface of the inner storage tank 43 so as to result in only a single wall at the points where the various access lines enter the tank 43. The outer wall could as well extend to and around the manway so as to completely encompass the inner tank and its manway. As discussed more fully below, any leakage from the storage tank, including the manway will be contained by the outer wall.

Also shown in FIG. 3 is an optional overfill feature which is particularly adapted for use in this invention. The drip sump compartment, because of its limited capacity is only able to catch minor spills and drippings. However, the storage tank 43 is provided with an internal retained capacity area which is capable of controlling overfills. The fill line 45 has an inner fill pipe 56 through which liquid flows during a filling operation. A concentric outer vapor recovery tube 47 leads from the fill end of the fill pipe to the top wall of the inner storage tank 43. Additionally, a vapor recovery extension tube 48 extends from about two inches to about eighteen inches from the top surface of the inner storage tank into the tank's interior. Similarly, a vent extension line 49 extends from about two inches to about eighteen inches from the top surface of the inner storage tank into the tank's interior. During the filling operation, liquid will flow through the fill pipe 46 and fill the storage tank until its level reaches the uppermost of the terminal ends of the vapor recovery extension tube 48 and vent extension line 49. A build-up of pressure resulting from air and vapors which are trapped in the upper part of the storage tank will prevent additional liquid from entering the area. An upper portion 50 of the storage tank represents the retained capacity area.

A trapped vapor release valve 51 and by-pass vent line 52 are also provided. The release valve 51 is controlled by a ground level control rod 53. The by-pass vent line 52 leads from the release valve to the fill line 45, as shown, or to the T-vent and vent line. Once the storage tank is substantially filled, the tank truck operator shuts off a flow valve at the truck and then turns the control rod to release pressure in the retained capacity area of the storage tank to the vent line. Liquid which has remained in the tank truck's delivery hose, and liquid which has filled the vapor recovery tube and vent line is now able to drain by gravity into the retained capacity area.

Obviously, the system shown in FIG. 3 is able to solve many of the problems faced by the service station industry. A fill drippings feature is provided by the drip sump compartment; an overfill feature is provided by the internal retained capacity components; and a secondary containment feature of the inner storage tank is provided by the outer wall.

Leak detection means are preferably used in the sleeve space of the storage tank systems of the invention to monitor for leakage through the fill line. Several different types of detection means can be used, including pressure change detectors, gas or liquid analyzers, and electronic probes. The detection means itself is preferably positioned within the sleeve area for ready accessibility. The detection means can be periodically checked or it can be electronically connected to a remote receiving station for continuous monitoring. Additionally, a second leak detection means leading to the closed space between the inner tank and outer wall of the double wall tank systems samples that space for leakage. Optionally, a sampling pipeline can extend completely to the bottom of the closed space where leaked liquid is likely to drain. These pipelines can follow the contour of the inner tank's outer wall or pass directly through the inner tank's storage area and bottom surface. Liquid tight fittings, of course, are required with the direct pipelines.

A preferred leak detection means in the double wall tank systems utilizes non-atmospheric air pressure throughout the closed space. Such detection means associated with the closed space between the inner tank and outer wall is capable of detecting any change in pressure resulting from a leak in the inner tank or outer wall. Conventional air pressure or a vacuum means is used for providing a positive or negative pressure. The use of air pressure with a flexible outer wall is not preferred because the wall may be gas permeable to a certain degree and loss of pressure because of this must be compensated for. When a vacuum is used, reinforcing means are used to maintain a spaced relationship between the tank and outer wall. A gas pervious material, for example a continuous foraminous or porous matting is placed within the closed annular space to maintain the spaced relationship. Jute, polyurethane foam, fiberglass matting, cotton matting, nylon matting and asbestos are examples of materials which can be used. A line leads from the non-atmospheric air pressure means to a gauge conveniently positioned, e.g. in an attendant's area for periodic checking.

Other leak detection means, e.g. a probe positioned within the sleeve area or any closed space can be used. The probe is capable of detecting preselected liquids, e.g. gasoline. Various probes are known. In one type, electric wires are encased in a gasoline-soluble covering. Leaked gasoline into the sleeve area or closed space will eventually dissolve the covering and cause a current in the wires to short circuit.

It should be apparent that variations of the invention described herein are possible. For example, other drip sump compartments of one piece design and other manners of attaching to the sleeve cover can be utilized. All such variations are within the scope of the claims.

What is claimed is:

1. A storage tank system having spill containment means for a fill line leading thereto, said system comprised of:
   (a) a storage tank for storing liquid;
   (b) a sleeve with a sleeve cover positioned on the storage tank in a non-liquid tight manner sufficient to keep a sleeve area therewithin substantially free of surrounding soil;
   (c) a drip sump compartment positioned on the sleeve cover of the sleeve, said drip sump compartment capable of catching spills and drippings during a filling operation; and
   (d) a fill line for adding liquid to the tank which extends through the drip sump compartment and sleeve area, said fill line having an opening at one end within the drip sump compartment for receiving liquid during a filling operation and a second opening at another end which leads directly to the interior of the storage tank.

2. The storage tank system of claim 1 further wherein the storage tank has a manway and the fill line extends through the manway.

3. The storage tank system of claim 2 wherein the sleeve extends from about twelve inches to about forty-eight inches above the top of the manway.

4. The storage tank system of claim 2 wherein the sleeve on the storage tank is attached in a non-liquid tight manner.

5. The storage tank system of claim 1 further wherein the fill line has a cap to seal the storage tank's interior.

6. The storage tank system of claim 5 further wherein a drain valve is positioned in the drip sump compartment to control flow of liquid from said compartment to a drain line which leads to the storage tank's interior.

7. The storage tank system of claim 6 wherein the drip sump compartment is comprised of a lower cylinder secured to the sleeve's cover and an upper slide height cylinder and means to secure said cylinders together when properly adjusted.

8. The storage tank system of claim 1 wherein the fill line is a coaxial fill line comprised of a fill pipe which extends into the storage tank and an outer concentric vapor recovery tube which extends to the top surface of the storage tank.

9. The storage tank system of claim 1 further comprising an outer wall encasing the storage tank.

10. The storage tank system of claim 9 wherein the outer wall is made of a fibrous reinforced resinous material.

11. The storage tank system of claim 1 wherein the storage tank has an internal retained capacity area.

12. The storage tank system of claim 1 further wherein a dispensing line and a vent line for the storage tank pass through the sleeve area.

13. The storage tank system of claim 1 further wherein the sleeve cover is held in a liquid tight manner to the sleeve.

* * * * *